(12) United States Patent
Lord et al.

(10) Patent No.: US 10,330,047 B2
(45) Date of Patent: Jun. 25, 2019

(54) ASYMMETRIC FAN NOZZLE IN HIGH-BPR SEPARATE-FLOW NACELLE

(71) Applicant: UNITED TECHNOLOGIES CORPORATION, Farmington, CT (US)

(72) Inventors: Wesley K. Lord, South Glastonbury, CT (US); Robert E. Malecki, Storrs, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 741 days.

(21) Appl. No.: 14/768,830

(22) PCT Filed: Dec. 18, 2013

(86) PCT No.: PCT/US2013/075955
§ 371 (c)(1),
(2) Date: Aug. 19, 2015

(87) PCT Pub. No.: WO2014/143281
PCT Pub. Date: Sep. 18, 2014

(65) Prior Publication Data
US 2016/0003194 A1 Jan. 7, 2016

Related U.S. Application Data

(60) Provisional application No. 61/800,318, filed on Mar. 15, 2013.

(51) Int. Cl.
*F02K 3/02* (2006.01)
*F02K 3/06* (2006.01)
(Continued)

(52) U.S. Cl.
CPC ............. *F02K 3/06* (2013.01); *B64D 33/02* (2013.01); *B64D 33/04* (2013.01); *F01D 25/24* (2013.01);
(Continued)

(58) Field of Classification Search
CPC . B64D 33/04; B64D 2033/0286; F01D 25/24; F05D 2250/73; F02K 1/78; F02K 3/06
See application file for complete search history.

(56) References Cited

U.S. PATENT DOCUMENTS 3,806,067 A    4/1974  Kutney
4,314,681 A *  2/1982  Kutney .................... B64C 7/02
                                                      244/130
4,466,587 A *  8/1984  Dusa ....................... B64C 7/02
                                                      244/1 N
(Continued)

OTHER PUBLICATIONS

European Search Report Application No. EP 13 87 8444.
International Search Report for related PCT Application No. PCT/US13/75955; report dated Apr. 18, 2014.

*Primary Examiner* — Lorne E Meade
(74) *Attorney, Agent, or Firm* — Cantor Colburn LLP

(57) ABSTRACT

A fan nozzle for an aircraft gas turbine engine is comprised of a core engine cowl that is disposed within a fan cowl so that an air flow area is defined therebetween. The core engine cowl and fan cowl are disposed around a horizontal central plane. The fan cowl has a substantially circular shape and is formed of an upper substantially semi-circular portion having a first radius and a lower substantially semi-circular portion having a second radius. The core engine cowl has a substantially circular shape and is formed of an upper substantially semi-circular portion having a third radius and a lower substantially semi-circular portion having a third radius. The upper substantially semi-circular portion of the core engine cowl includes a left arcuate member and a right arcuate member. The second radius is less than the first radius and the third radius is less than the fourth radius.

9 Claims, 3 Drawing Sheets

(51) Int. Cl.
  *F02K 1/78*    (2006.01)
  *B64D 33/02*   (2006.01)
  *F01D 25/24*   (2006.01)
  *F02C 3/04*    (2006.01)
  *B64D 33/04*   (2006.01)

(52) U.S. Cl.
  CPC .................. *F02C 3/04* (2013.01); *F02K 1/78* (2013.01); *B64D 2033/0286* (2013.01); *F05D 2220/32* (2013.01); *F05D 2240/24* (2013.01); *F05D 2240/35* (2013.01); *F05D 2250/73* (2013.01)

(56) References Cited

U.S. PATENT DOCUMENTS

| | | | | |
|---|---|---|---|---|
| 5,203,163 | A | * | 4/1993 | Parsons .................. F02C 6/08 60/226.1 |
| 5,369,954 | A | | 12/1994 | Stuart et al. |
| 7,900,433 | B2 | * | 3/2011 | McCall .................. F01D 25/28 239/265.19 |
| 8,074,440 | B2 | * | 12/2011 | Kohlenberg .......... B64D 33/04 60/226.1 |
| 8,418,471 | B2 | * | 4/2013 | Baltas .................. F02K 1/15 60/226.1 |
| 8,561,384 | B2 | * | 10/2013 | McCall .................. F01D 25/28 239/265.19 |
| 9,181,899 | B2 | * | 11/2015 | Dindar .................. B64D 33/04 |
| 2008/0053061 | A1 | | 3/2008 | McCall |
| 2009/0053058 | A1 | | 2/2009 | Kohlenberg et al. |
| 2009/0288387 | A1 | | 11/2009 | Baltas |
| 2010/0050651 | A1 | | 3/2010 | Dindar et al. |
| 2011/0014045 | A1 | | 1/2011 | McCall |

\* cited by examiner

ASYMMETRIC FAN NOZZLE IN HIGH-BPR SEPARATE-FLOW NACELLE

CROSS-REFERENCE TO RELATED APPLICATION

This Application is a US National Stage under 35 USC § 371 of International Patent Application No. PCT/US13/75955 filed on Dec. 18, 2013 based on US Provisional Patent Application Ser. No. 61/800,318 filed on Mar. 15, 2013.

TECHNICAL FIELD

The subject matter of the present disclosure relates generally to gas turbine engines, and more particularly, to fan nozzles for gas turbine engines.

BACKGROUND

Many modern day aircraft employ gas turbine engines. Accordingly, it is well known that gas turbine engines include a fan, a compressor, a combustor and a turbine. The serial flow combination of the compressor, the combustor and the turbine is commonly referred to as a core engine. Once air enters the core engine it is pressurized in the compressor. The pressurized air is then mixed with fuel in the combustor. This mixture is subsequently burned, which generates hot combustion gases that flow downstream to the turbine. In turn, the turbine extracts energy from the hot combustion gases to drive the compressor and fan. The excess hot combustion gases, not used by the turbine to drive the compressor and fan, are discharged from the core engine through an annular exhaust nozzle, which produces thrust that contributes in powering an associated aircraft. In addition to this thrust, a much larger amount of thrust is generated by the fan taking in ambient air, accelerating that air and discharging it from a fan exhaust nozzle. This thrust from the fan exhaust nozzle provides the majority of propulsion thrust for the aircraft.

In an effort to increase efficiency, gas turbine engines have evolved to produce greater thrust while, at the same time, consuming less fuel. For the most part, achieving greater thrust on less fuel consumption is based on, among other factors, controlling the speed and direction of the fan generated thrust and the core engine generated thrust. The cross sectional flow areas of the core engine and fan exhaust nozzles generally determine the speed of such flows. It follows that regulating the cross sectional flow areas, by either pre-selecting the size of fixed area nozzles for theoretical engine operating conditions or utilizing variable area exhaust nozzles which can be adjusted in area for ideal flow throughout a range of operating conditions, will achieve control of flow speed. As for directional flow control, it is generally controlled by the specific geometric shape of the nozzles. Further details can be found in commonly assigned U.S. Pat. No. 7,900,433.

Typically, a gas turbine engine has a nacelle, which includes a core engine cowl and an outer fan cowl. The core engine cowl provides an aerodynamically contoured cover for the core engine. This core engine cowl extends around the core engine and terminates at the downstream end thereof at the engine exhaust nozzle. The outer fan cowl surrounds the core engine cowl and the fan blades. In this configuration, a fan duct, which terminates downstream at the fan exhaust nozzle, is functionally defined by the area between the outer fan cowl and the core engine cowl.

With most commercial transport aircraft today, the engine and nacelle are attached to the underside of the wing by a structural pylon that is surrounded by an aerodynamic fairing. Commonly, the pylon is positioned in such a way that it cuts across the top of the fan nozzle. This orientation typically causes a partial area blockage in the fan nozzle. As can be appreciated from the discussion above, this obstruction to the cross sectional flow area of the fan exhaust nozzle has a negative impact on efficiency. Additionally, the pylon obstruction creates circumferential flow migration with associated aerodynamic loss and non-axial thrust vector.

Thus, there is a need for a fan nozzle that accommodates for this pylon blockage in order to improve thrust efficiency and thrust vector.

SUMMARY

In accordance with an aspect of the disclosure, a fan nozzle for a gas turbine engine is provided. The fan nozzle is comprised of a core engine cowl that is disposed within a fan cowl so that an air flow area is defined therebetween. The core engine cowl and fan cowl are disposed around a horizontal central plane. The fan cowl has a substantially circular shape and is formed of an upper substantially semi-circular portion having a first radius and a lower substantially semi-circular portion having a second radius. The core engine cowl has a substantially circular shape and is formed of an upper substantially semi-circular portion having a third radius and a lower substantially semi-circular portion having a fourth radius. The upper substantially semi-circular portion of the core engine cowl includes a left arcuate member and a right arcuate member. The second radius is less than the first radius and the third radius is less than the fourth radius.

In accordance with another aspect of the disclosure, the left and right arcuate members each have a cross-sectional area, where the cross-sectional areas of the left and right arcuate members are approximately a quarter of a cross-sectional area of the upper substantially semi-circular portion of the core engine cowl.

In accordance with yet another aspect of the disclosure, the left and right arcuate members are gradually offset radially downwardly toward the horizontal central plane.

In further accordance with another aspect of the disclosure, the lower substantially semi-circular portion of the fan cowl is gradually offset radially upwardly toward the horizontal central plane.

In further accordance with still another aspect of the disclosure, the first radius has a variable measurement taken along the upper substantially semi-circular portion of the fan cowl, the second radius has a variable measurement taken along the lower substantially semi-circular portion of the fan cowl, the third radius has a variable measurement taken along the upper substantially semi-circular portion of the core engine cowl and the fourth radius has a variable measurement taken along the lower substantially semi-circular portion of the core engine cowl.

In further accordance with yet another aspect of the disclosure, the first radius has a uniform measurement taken along the upper substantially semi-circular portion of the fan cowl, the second radius has a variable measurement taken along the lower substantially semi-circular portion of the fan cowl, the third radius has a variable measurement taken along the upper substantially semi-circular portion of the core engine cowl and the fourth radius has a uniform measurement taken along the lower substantially semi-circular portion of the core engine cowl.

In further accordance with still yet another aspect of the disclosure, the air flow area above the horizontal central plane is approximately equal to the air flow area below the horizontal central plane.

In accordance with another aspect of the disclosure, a fan nozzle for an aircraft gas turbine engine is provided. The fan nozzle is comprised of a core engine cowl that is disposed within a fan cowl so that an air flow area is defined therebetween. The core engine cowl and fan cowl are disposed around a horizontal central plane. The fan cowl has a substantially circular shape and is formed of an upper substantially semi-circular portion having a first radius and a lower substantially semi-circular portion having a second radius. The core engine cowl has a substantially circular shape and is formed of an upper substantially semi-circular portion having a third radius and a lower substantially semi-circular portion having a fourth radius. The upper substantially semi-circular portion of the fan cowl includes a left arcuate member and a right arcuate member. The second radius is less than the first radius and the third radius is less than the fourth radius.

In accordance with another aspect of the disclosure, the left and right arcuate members each have a cross-sectional area, where the cross-sectional areas of the left and right arcuate members are approximately a quarter of a cross-sectional area of the upper substantially semi-circular portion of the fan cowl.

In accordance with yet another aspect of the disclosure, the left and right arcuate members are gradually offset radially upwardly away the horizontal central plane.

In further accordance with still another aspect of the disclosure, the lower substantially semi-circular portion of the core engine cowl is gradually offset radially downwardly away from the horizontal central plane.

In further accordance with yet another aspect of the disclosure, the first radius has a variable measurement taken along the upper substantially semi-circular portion of the fan, the second radius has a variable measurement taken along the lower substantially semi-circular portion of the fan cowl, the third radius has a variable measurement taken along the upper substantially semi-circular portion of the core engine cowl and the fourth radius has a variable measurement taken along the lower substantially semi-circular portion of the core engine cowl.

In further accordance with still yet another aspect of the disclosure, the first radius has a variable measurement taken along the upper substantially semi-circular portion of the fan, the second radius has a uniform measurement taken along the lower substantially semi-circular portion of the fan cowl, the third radius has a uniform measurement taken along the upper substantially semi-circular portion of the core engine cowl and the fourth radius has a variable measurement taken along the lower substantially semi-circular portion of the core engine cowl.

In accordance with an aspect of the disclosure, a gas turbine engine is provided. The gas turbine engine includes a fan and a core engine. The engine also includes a core engine cowl that is disposed within a fan cowl so that an air flow area is defined therebetween. The core engine cowl and fan cowl are disposed around a horizontal central plane. The fan cowl has a substantially circular shape and has a first trailing rim. The first trailing rim is formed of an upper substantially semi-circular portion having a first radius and a lower substantially semi-circular portion having a second radius. The core engine cowl has a substantially circular shape and has a second trailing rim. The second trailing rim is formed of an upper substantially semi-circular portion having a third radius and a lower substantially semi-circular portion having a fourth radius. The upper substantially semi-circular portion of the second trailing rim includes a left arcuate member and a right arcuate member. The second radius is less than the first radius and the third radius is less than the fourth radius.

In accordance with another aspect of the disclosure, the left and right arcuate members each have a cross-sectional area, where the cross-sectional areas of the left and right arcuate members are approximately a quarter of a cross-sectional area of the upper substantially semi-circular portion of the second trailing rim.

In accordance with yet another aspect of the disclosure, the left and right arcuate members are gradually offset radially downwardly toward the horizontal central plane.

In further accordance with another aspect of the disclosure, the lower substantially semi-circular portion of the first trailing rim is gradually offset radially upwardly toward the horizontal central plane.

In further accordance with still another aspect of the disclosure, the second radius has a variable measurement taken along the lower substantially semi-circular portion of the first trailing rim and the third radius has a variable measurement taken along the upper substantially semi-circular portion of the second trailing rim.

In further accordance with yet another aspect of the disclosure, the air flow area above the horizontal central plane is approximately equal to the air flow area below the horizontal central plane.

Other features and advantages of the disclosed systems and methods will be appreciated from reading the attached detailed description in conjunction with the included drawing figures.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
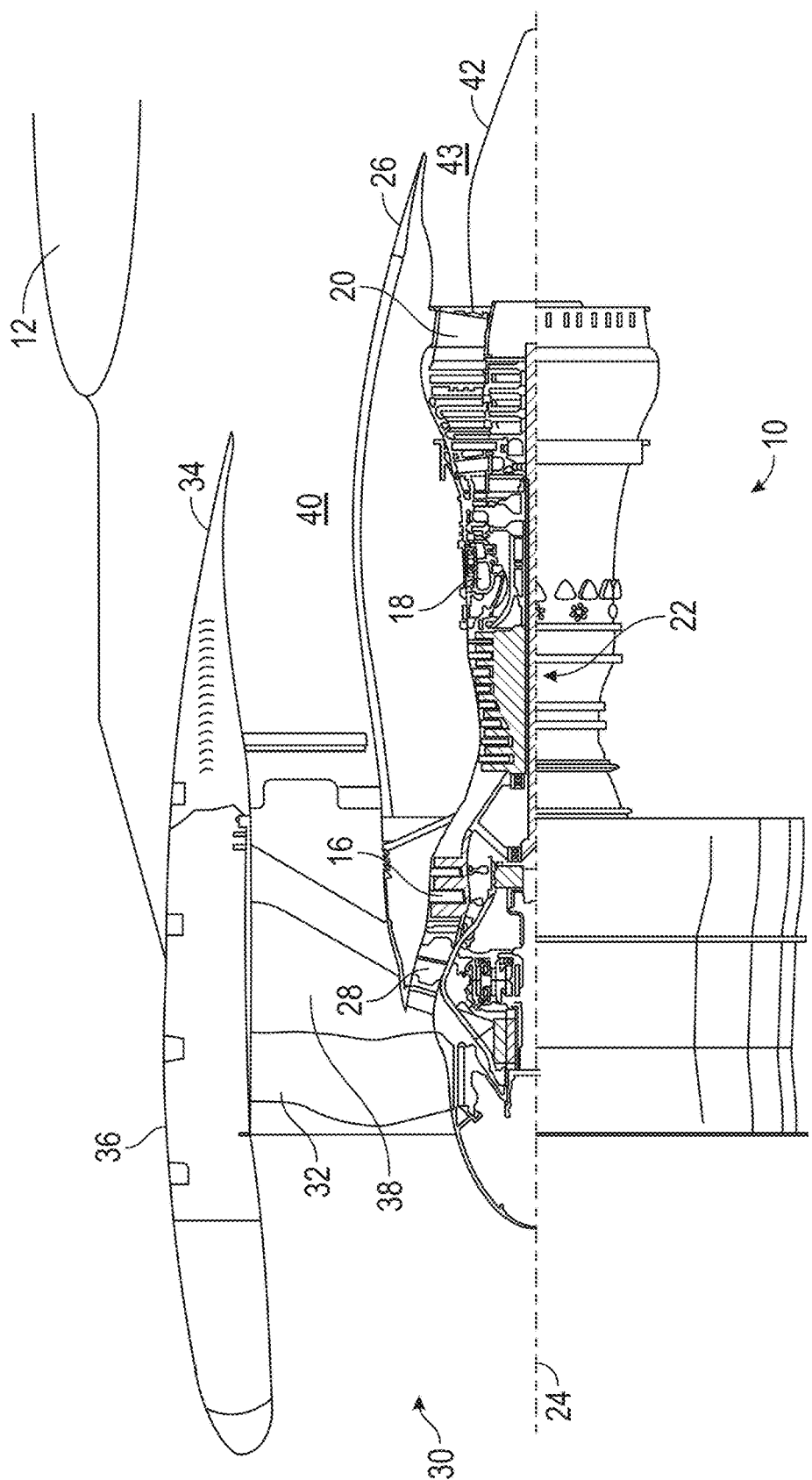
FIG. 1 is a schematic side view of a gas turbine engine with portions of the nacelle thereof sectioned and broken away to show details of the present disclosure.

Referring now to FIG. 1, a gas turbine engine constructed in accordance with the present disclosure is generally referred to by reference numeral 10. The engine 10 is shown to be mounted to the underside of a wing 12 of an aircraft by a pylon 14, which is surrounded by an aerodynamic fairing. The gas turbine engine 10 includes a compressor 16, a combustor 18 and a turbine 20. The serial combination of the compressor 16, the combustor 18 and the turbine 20 is commonly referred to as a core engine 22. The core engine 22 lies along a longitudinal central axis 24. A core engine cowl 26 surrounds the core engine 22.

As is well known in the art, air enters compressor 16 at an inlet 28 and is pressurized. The pressurized air then enters the combustor 18. In the combustor 18, the air mixes with jet fuel and is burned, generating hot combustion gases that flow downstream to the turbine 20. The turbine 20 extracts energy from the hot combustion gases to drive the compressor 16 and a fan 30, which has fan blades 32. As the turbine 20 drives the fan 30, the fan blades 32 rotate so as to take in ambient air. This process accelerates the free stream, ambient air to provide the majority of the useful thrust produced by the engine. Generally, in modern gas turbine engines, the fan 30 has a much greater diameter than the core engine 22. Because of this, the volumetric flow through the fan 30 can be 5-10 times higher, or more, than the volumetric flow through the core engine 22. The ratio of flow through the fan 30 relative to flow through the core engine 22 is known as the bypass ratio.

The fan 30 and core engine cowl 26 are surrounded by a fan cowl 34 forming part of a nacelle 36. The nacelle 36 is supported from the wing 12 by the pylon 14. A fan duct 38 is functionally defined by the area between the core engine cowl 26 and the fan cowl 34. The fan duct 38 is substantially annular in shape so that it can accommodate the air flow produced by fan 30. This air flow travels the length of the fan duct 38 and exits downstream at a fan nozzle 40. A tail cone 42 may be provided at the core engine exhaust nozzle 43 to smooth the discharge of excess hot combustion gases that were not used by the turbine 20 to drive the compressor 16 and fan 30.

The gas turbine engine 10 is attached to the wing 12 of an aircraft by the pylon 14, significant amount of fan air flow through the fan duct 38 is typically blocked at an upper portion of the fan nozzle 40 upon exit. This blockage typically ranges between 5-10 percent of the fan nozzle area and causes, among other things, circumferential air flow migration. In particular, the blockage at the upper portion of the fan nozzle results in a net migration of fan air flow from the upper portion of the fan nozzle to the lower portion of the fan nozzle. Ideally, to achieve maximum efficiency of the gas turbine engine, the thrust produced by the fan and core engine should be directed parallel to the central axis of the core engine. However, the greater flow of air through the lower portion of the fan nozzle skews the direction of the thrust, from the central axis, produced by the fan. This skewing lowers engine thrust efficiency and thrust vector. It is in this regard that the present invention greatly improves upon the prior art.

Figure 2:
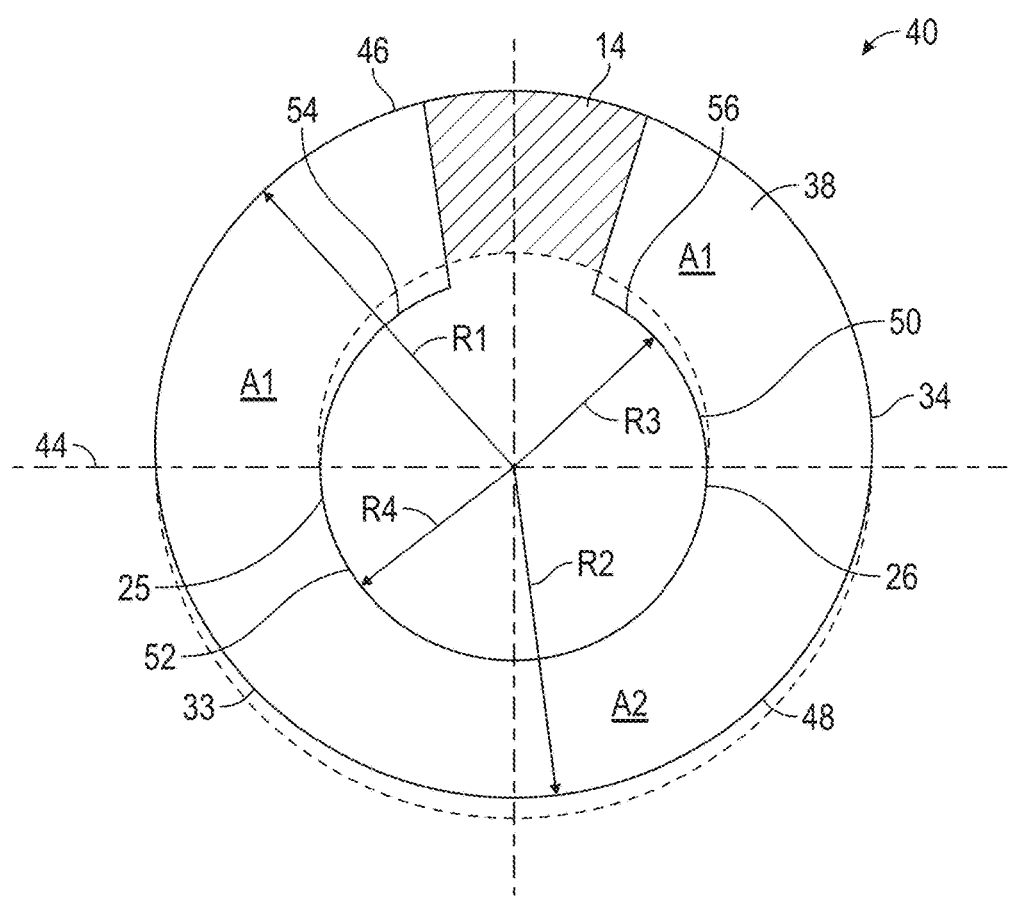
FIG. 2 is an end view of a fan nozzle constructed in accordance with the teachings of this disclosure.

More specifically, as described above, the fan nozzle 40 is located at the downstream exit of the fan duct 38, which is defined as the area between the fan cowl 34 and the core engine cowl 26. Thus, the shape of the fan nozzle 40 is defined by the area between a trailing rim 25 of core engine cowl 26 and a rim 33 of fan cowl 34 as shown best in FIG. 2. As shown, the fan cowl 34 and core engine cowl 26 are positioned around a horizontal central plane 44, which is in the same plane as the longitudinal central axis 24 (depicted in FIG. 1).

In accordance with the present disclosure, the trailing rim 33 of fan cowl 34 is substantially circular in shape and is formed by an upper substantially semi-circular portion 46 and a lower substantially semi-circular portion 48. The upper substantially semi-circular portion 46 is positioned above the horizontal central plane 44 and has a radius R1. Radius R1 may have a variable or a uniform measurement taken along the path of upper substantially semi-circular portion 46.

The lower substantially semi-circular portion 48 is positioned below the horizontal central plane 44 and has a radius R2. The lower substantially semi-circular portion 48 is gradually offset radially upwardly toward the horizontal central plane 44 thereby causing radius R2 to have a variable measurement taken along the path of the lower substantially semi-circular portion 48. In other words, radius R2, as measured from a bottom center point of the lower substantially semi-circular portion 48, gradually increases as radius R2 moves clockwise along the path of the lower substantially semi-circular portion 48 towards the horizontal central plane 44. In like manner, radius R2 also gradually increases as radius R2 moves counter clockwise along the path of the lower substantially semi-circular portion 48 towards the horizontal central plane 44. It follows that the radius R2 is less than R1 except when measured at the horizontal central plane 44, where R2 is approximately less than R1.

Turing to the trailing rim 25 of core engine cowl 26, it is substantially circular in shape and is formed by an upper substantially semi-circular portion 50 and a lower substantially semi-circular portion 52. The upper substantially semi-circular portion 50 is positioned above the horizontal central plane 44 and has a radius R3. Radius R3 has a variable measurement taken along the path of the substantially semi-circular portion 50 due to the upper substantially semi-circular portion 50 having a left arcuate member 54 and a right arcuate member 56. The left arcuate member 54 and the right arcuate member 56 are gradually offset radially downwardly toward the horizontal central plane 44. The left arcuate member 54 is approximately a quarter measurement of upper substantially semi-circular portion 50. The right arcuate member 56 is also approximately a quarter measurement of upper substantially semi-circular portion 50.

The lower semi-circular portion 52 is positioned below the horizontal central plane 44 and has a radius R4. Radius R4 may have a variable or a uniform measurement taken along the path of lower semi-circular portion 52. The measurement of radius R3 taken along either the left or right arcuate portions 54,56 is approximately less than the measurement of radius R4.

In this manner, an air flow area A1 of the fan nozzle 40 above the horizontal central plane 44 is approximately equal to an air flow area A2 of the fan nozzle 40 below the horizontal central plane 44. The flow area A1 is defined as the area of fan nozzle 40 above the horizontal central plane 44 minus the area of obstruction caused by the pylon 14. In doing so, the air flow area A1 now compensates for the circumferential air flow migration to area A2 caused by the obstruction of the pylon 14 to area A1, and thus, permits the direction of thrust to be substantially more parallel to the longitudinal central axis 24. It follows that engine thrust efficiency and thrust vector greatly improves as a result. In addition, the present disclosure has the potential to reduce exhaust jet mixing noise and to reduce jet/flap interaction noise.

Figure 3:
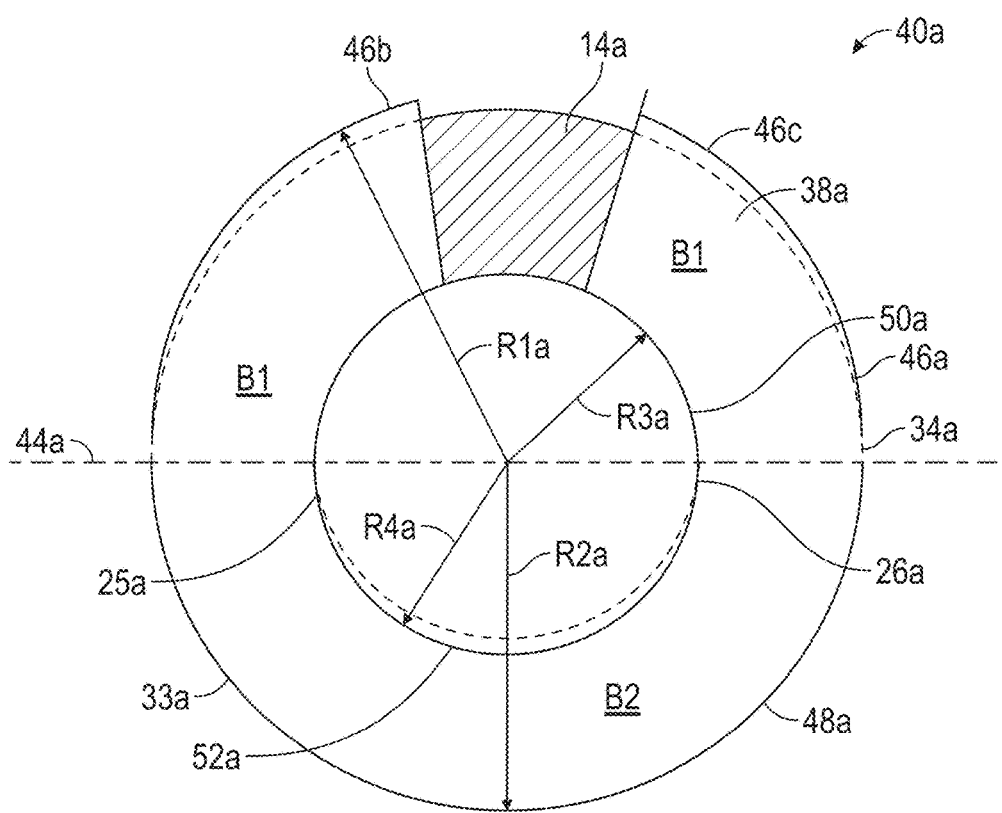
FIG. 3 is an end view of an alternative embodiment of a fan nozzle constructed in accordance with this disclosure.

Discussion is now directed to FIG. 3 illustrating an alternative embodiment of the present disclosure. A fan nozzle 40a is again located at the downstream exit of the fan duct 38a, which is defined as the area between the fan cowl 34a and the core engine cowl 26a. Thus, the shape of the fan nozzle 40a is defined by the area between a trailing rim 25a of core engine cowl 26a and a trailing rim 33a of fan cowl 34a. As shown, the fan cowl 34a and core engine cowl 26a are positioned around a horizontal central plane 44a, which is in the same plane as the longitudinal central axis 24 (depicted in FIG. 1).

The trailing rim 33a of fan cowl 34a is again substantially circular in shape similar to the first embodiment, but is formed by an upper substantially semi-circular portion 46a and a lower substantially semi-circular portion 48a. The upper substantially semi-circular portion 46a is positioned above the horizontal central plane 44a and has a radius R1a. Radius R1a has a variable measurement taken along the path of the substantially semi-circular portion 46a due to the upper substantially semi-circular portion 46a having a left arcuate member 46b and a right arcuate member 46c. This differs from the first embodiment, which has lower arcuate member 54 and 56 instead. The left arcuate member 46b and the right arcuate member 46c are gradually offset radially upwardly away from the horizontal central plane 44a. The left arcuate member 46b is approximately a quarter measurement of upper substantially semi-circular portion 46a. The right arcuate member 46c is also approximately a quarter measurement of upper substantially semi-circular portion 46a.

The lower substantially semi-circular portion 48a is positioned below the horizontal central plane 44a and has a radius R2a. Radius R2a may have a variable or a uniform measurement taken along the path of lower substantially semi-circular portion 48a. The measurement of radius R2a is approximately less than the measurement of radius R1a taken along either the left or right arcuate portions 46b,46c.

The trailing rim 25a of core engine cowl 26a is substantially circular in shape and is formed by an upper substantially semi-circular portion 50a and a lower substantially semi-circular portion 52a. The upper substantially semi-circular portion 50a is positioned above the horizontal central plane 44a and has a radius R3a. Radius R3a may have a variable or a uniform measurement taken along the path of upper semi-circular portion 50a.

The lower substantially semi-circular portion 52a is positioned below the horizontal central plane 44a and has a radius R4a. The lower substantially semi-circular portion 52a is gradually offset radially downwardly away from the horizontal central plane 44a thereby causing radius R4a to have a variable measurement taken along the path of the lower substantially semi-circular portion 52a. In other words, radius R4a, as measured from a bottom center point of the lower substantially semi-circular portion 52a, gradually decreases as radius R4a moves clockwise along the path of the lower substantially semi-circular portion 52a towards the horizontal central plane 44a. In like manner, radius R4a also gradually decreases as radius R4a moves counter clockwise along the path of the lower substantially semi-circular portion 52a towards the horizontal central plane 44a. It follows that the radius R4a is greater than R3a except when measured at the horizontal central plane 44a, where R4a is approximately greater than R3a.

In this manner, the air flow area B1 of the fan nozzle 40a above the horizontal central plane 44a is approximately equal to the air flow area B2 of the fan nozzle 40a below the horizontal central plane 44a. The flow area B1 is defined as the area of fan nozzle 40a above the horizontal central plane 44a minus the area of obstruction caused by the pylon 14a. As a result, the air flow area B1 compensates for the circumferential air flow migration to area B2 caused by the obstruction of the pylon 14a, and thus, permits the direction of thrust to be substantially more parallel to the longitudinal central axis 24. This embodiment similarly improves the engine's thrust efficiency and thrust vector, and has the potential to reduce exhaust jet mixing noise and to reduce jet/flap interaction noise.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A fan nozzle for a gas turbine engine, comprising:
a fan cowl positioned about a central longitudinal axis of the gas turbine engine and being formed of an upper portion and a lower portion, the upper portion of the fan cowl having a first radius with respect to the central longitudinal axis of the gas turbine engine at a trailing rim of the fan cowl, the lower portion of the fan cowl having a second radius with respect to the central longitudinal axis of the gas turbine engine at the trailing rim of the fan cowl, wherein the first radius is constant and the second radius varies and wherein the second radius is less than the first radius;
a core engine cowl disposed within the fan cowl and positioned about the central longitudinal axis of the gas turbine engine, the core engine cowl being formed of an upper portion and a lower portion, the upper portion of the core engine cowl having a third radius with respect to the central longitudinal axis of the gas turbine engine at a rim of the core engine cowl, the upper portion of the core engine cowl being formed of a left arcuate member and a right arcuate member, the lower portion of the core engine cowl having a fourth radius with respect to the central longitudinal axis of the engine at the rim of the core engine cowl, wherein the third radius varies and the fourth radius is constant and wherein the third radius is less than the fourth radius;
a pylon located between the fan cowl and the core engine cowl; and
an air flow area being defined between the fan cowl and the core engine cowl.

2. The fan nozzle of claim 1, wherein the left and right arcuate members each define a cross-sectional area with respect to the central longitudinal axis of the gas turbine engine, the cross-sectional areas defined by the left and right arcuate members each being approximately a quarter of a cross-sectional area of the upper portion of the core engine cowl.

3. The fan nozzle of claim 1, wherein an air flow area above the central longitudinal axis of the gas turbine engine is approximately equal to an air flow area below the central longitudinal axis of the gas turbine engine.

4. A fan nozzle for a gas turbine engine, comprising:
a fan cowl position about a central longitudinal axis of the gas turbine engine and being formed of an upper portion and a lower portion, the upper portion of the fan cowl having a first radius with respect to the central longitudinal axis of the gas turbine engine at a trailing rim of the fan cowl, the upper portion of the fan cowl being formed of a left arcuate member and a right arcuate member, the lower portion of the fan cowl having a second radius with respect to the central longitudinal axis of the gas turbine engine at the trailing rim of the fan cowl, wherein the first radius varies and the second radius is constant and the second radius is less than the first radius;

a core engine cowl disposed within the fan cowl and positioned about the central longitudinal axis of the gas turbine engine, the core engine cowl being formed of an upper portion and a lower portion, the upper portion of the core engine cowl having a third radius with respect to the central longitudinal axis of the gas turbine engine at a rim of the core engine cowl, the lower portion of the core engine cowl having a fourth radius with respect to the central longitudinal axis of the gas turbine engine at the trailing rim of the core engine cowl, wherein the third radius is constant and the fourth radius varies and the third radius is less than the fourth radius;

a pylon located between the fan cowl and the core engine cowl; and an air flow area being defined between the fan cowl and the core engine cowl.

5. The fan nozzle of claim 4, wherein the left and right arcuate members each define a cross-sectional area with respect to the central longitudinal axis of the gas turbine engine, the cross-sectional areas defined by the left and right arcuate members each being approximately a quarter of a cross-sectional area of the upper portion of the fan cowl.

6. The fan nozzle of claim 5, wherein the air flow area above the central longitudinal axis is approximately equal to the air flow area below the central longitudinal axis.

7. A gas turbine engine, comprising:

a fan;

a fan cowl surrounding the fan;

a core engine cowl disposed within the fan cowl, the core engine cowl surrounding a core engine, the core engine driving the fan, the fan cowl surrounding the core engine cowl and the fan, the fan cowl and the core engine cowl positioned around a central longitudinal axis of the gas turbine engine, the fan cowl having a first trailing rim, the core engine cowl having a second rim, the first trailing rim being formed of an upper portion and a lower portion, the upper portion of the first trailing rim having a first radius with respect to the central longitudinal axis of the gas turbine engine, the lower portion of the first trailing rim having a second radius with respect to the central longitudinal axis of the gas turbine engine, wherein the first radius is constant and the second radius varies and wherein the second radius is less than the first radius, the second rim having an upper portion and a lower portion, the upper portion of the second rim having a third radius with respect to the central longitudinal axis of the gas turbine engine, the upper portion of the second rim being formed of a left arcuate member and a right arcuate member, the lower portion of the second rim having a fourth radius semi-circular, wherein the third radius varies and the fourth radius is constant and wherein the third radius is less than the fourth radius;

a pylon located between the fan cowl and the core engine cowl; and an air flow area being defined between the fan cowl and the core engine cowl.

8. The gas turbine engine of claim 7, wherein the left and right arcuate members each define a cross-sectional area with respect to the central longitudinal axis of the gas turbine engine, the cross-sectional areas defined by the left and right arcuate members each being approximately a quarter of a cross-sectional area of the upper portion of the second rim.

9. The gas turbine engine of claim 7, wherein the air flow area above the central longitudinal axis is approximately equal to the air flow area below the central longitudinal axis.

* * * * *